(12) United States Patent
Sharma et al.

(10) Patent No.: US 11,374,811 B2
(45) Date of Patent: Jun. 28, 2022

(54) AUTOMATICALLY DETERMINING SUPPORTED CAPABILITIES IN SERVER HARDWARE DEVICES

(71) Applicant: EMC IP Holding Company LLC, Hopkinton, MA (US)

(72) Inventors: Anurag Sharma, Cedar Park, TX (US); Brian P. Korinek, Austin, TX (US); Sujayendra R. Thammaiah, Ashland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/102,690

(22) Filed: Nov. 24, 2020

(65) Prior Publication Data

US 2022/0166669 A1 May 26, 2022

(51) Int. Cl.
*H04L 41/0813* (2022.01)
*H04L 9/40* (2022.01)

(52) U.S. Cl.
CPC .......... *H04L 41/0813* (2013.01); *H04L 63/02* (2013.01)

(58) Field of Classification Search
CPC ............................ H04L 63/02; H04L 41/0813
USPC ....................................................... 709/220
See application file for complete search history.

(56) References Cited

U.S. PATENT DOCUMENTS

| | | | |
|---|---|---|---|
| 7,228,458 B1 * | 6/2007 | Kesavan | G06F 11/2221 714/41 |
| 9,930,051 B1 | 3/2018 | Potlapally et al. | |
| 2003/0135382 A1 * | 7/2003 | Marejka | G06F 11/3495 709/232 |
| 2008/0082661 A1 * | 4/2008 | Huber | H04L 41/0681 709/224 |
| 2015/0058498 A1 * | 2/2015 | Lee | G06F 3/061 710/6 |
| 2016/0154661 A1 | 6/2016 | Paul et al. | |

(Continued)

OTHER PUBLICATIONS

Tomek, EMC ESRS—basic overview, Jul. 30, 2014, storagefreak.net, https://www.storagefreak.net/2014/07/emc-esrs-basic-overview (Year: 2014).*

(Continued)

*Primary Examiner* — Zi Ye
(74) *Attorney, Agent, or Firm* — Ryan, Mason & Lewis, LLP

(57) ABSTRACT

Methods, apparatus, and processor-readable storage media for automatically determining supported capabilities in server hardware devices are provided herein. An example computer-implemented method includes identifying multiple hardware devices associated with at least one server; determining one or more capabilities supported by at least a portion of the multiple identified hardware devices by processing data related to the at least one server and one or more of the multiple identified hardware devices; comparing the one or more determined capabilities supported by at least a portion of the multiple identified hardware devices to one or more parameters of a user-designated server configuration; and performing at least one automated action based at least in part on comparing the one or more determined capabilities supported by at least a portion of the multiple identified hardware devices to the one or more parameters of the user-designated server configuration.

20 Claims, 7 Drawing Sheets

(56) References Cited

U.S. PATENT DOCUMENTS

2016/0308886 A1\* 10/2016 Lee .................... H04L 63/1441
2020/0119997 A1     4/2020 Chatterjee

OTHER PUBLICATIONS

EMC, EMC Secure Remote Services Site Planning Guide, Jan. 2018, delltechnologies.com, https://www.delltechnologies.com/asset/en-us/services/support/technical-support/docu85633.pdf (Year: 2018).\*

\* cited by examiner

AUTOMATICALLY DETERMINING SUPPORTED CAPABILITIES IN SERVER HARDWARE DEVICES

FIELD

The field relates generally to information processing systems, and more particularly to managing devices using such systems.

BACKGROUND

In connection with engineered solutions built using one or more types of servers, hardware inventory information is commonly monitored. However, hardware from different vendors can often vary in capabilities, specifically with respect to management operations. Additionally, many engineered solutions are hard-coded to vendor-specified device capabilities, which, for varied hardware use cases (e.g., hardware use cases involving particular software), can result in a lack of knowledge regarding what functionalities the given engineered solution can provide to a user.

SUMMARY

Illustrative embodiments of the disclosure provide techniques for automatically determining supported capabilities in server hardware devices. An exemplary computer-implemented method includes identifying multiple hardware devices associated with at least one server, and determining one or more capabilities supported by at least a portion of the multiple identified hardware devices by processing data related to the at least one server and one or more of the multiple identified hardware devices. The method also includes comparing the one or more determined capabilities supported by at least a portion of the multiple identified hardware devices to one or more parameters of a user-designated server configuration. Further, the method additionally includes performing at least one automated action based at least in part on comparing the one or more determined capabilities supported by at least a portion of the multiple identified hardware devices to the one or more parameters of the user-designated server configuration.

Illustrative embodiments can provide significant advantages relative to conventional server solution management techniques. For example, challenges associated with uncertainty arising from a lack of knowledge regarding what functionalities a varied hardware solution can provide to a user are overcome in one or more embodiments through automatically determining what capabilities are supported by various hardware devices and performing automated actions in connection with server solution configurations based thereon.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
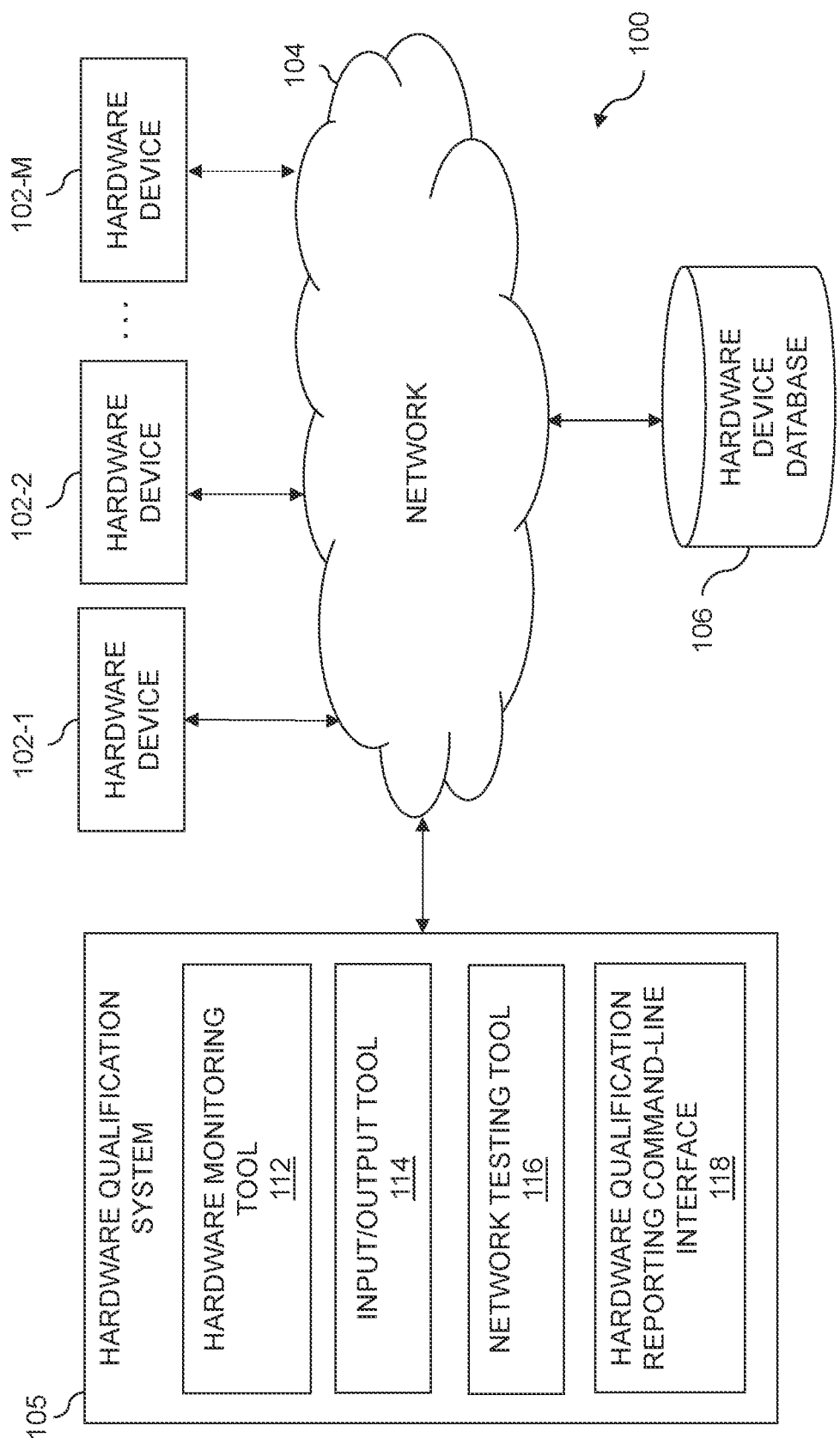
FIG. 1 shows an information processing system configured for automatically determining supported capabilities in server hardware devices in an illustrative embodiment.

FIG. 1 shows a computer network (also referred to herein as an information processing system) 100 configured in accordance with an illustrative embodiment. The computer network 100 comprises a plurality of hardware devices 102-1, 102-2, . . . 102-M, collectively referred to herein as hardware devices 102 (also occasionally referred to herein as nodes). The hardware devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is hardware qualification system 105.

The hardware devices 102 may comprise, for example, servers, storage enclosures, disk drives, network interface cards (NICs), host bus adapters (HBAs), as well as mobile telephones, laptop computers, tablet computers, desktop computers or other types of computing devices. Such devices are examples of what are more generally referred to herein as "processing devices." Some of these processing devices are also generally referred to herein as "computers."

The hardware devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, hardware qualification system 105 can have an associated database 106 configured to store data pertaining to hardware devices, which comprise, for example, data pertaining to hardware device capabilities, hardware device performance, etc. (such as further detailed herein).

The database 106 in the present embodiment is implemented using one or more storage systems associated with hardware qualification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with hardware qualification system 105 can be one or more input-output devices, which illustratively comprise keyboards, displays or other types of input-output devices in any combination. Such input-output devices can be used, for example, to support one or more user interfaces to hardware qualification system 105, as well as to support communication between hardware qualification system 105 and other related systems and devices not explicitly shown.

Additionally, hardware qualification system 105 in the FIG. 1 embodiment is assumed to be implemented using at least one processing device. Each such processing device generally comprises at least one processor and an associated memory, and implements one or more functional modules for controlling certain features of hardware qualification system 105.

More particularly, hardware qualification system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows hardware qualification system 105 to communicate over the network 104 with the hardware devices 102, and illustratively comprises one or more conventional transceivers.

The hardware qualification system 105 further comprises hardware monitoring tool 112, input/output tool 114, network testing tool 116, and hardware qualification reporting command-line interface (CLI) 118.

It is to be appreciated that this particular arrangement of modules 112, 114, 116 and 118 illustrated in the hardware qualification system 105 of the FIG. 1 embodiment is presented by way of example only, and alternative arrangements can be used in other embodiments. For example, the functionality associated with modules 112, 114, 116 and 118 in other embodiments can be combined into a single module, or separated across a larger number of modules. As another example, multiple distinct processors can be used to implement different ones of modules 112, 114, 116 and 118 or portions thereof.

At least portions of modules 112, 114, 116 and 118 may be implemented at least in part in the form of software that is stored in memory and executed by a processor.

It is to be understood that the particular set of elements shown in FIG. 1 for automatically determining supported capabilities in server hardware devices involving hardware devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, hardware qualification system 105 and hardware device database 106 can be on and/or part of the same processing platform.

An exemplary process utilizing modules 112, 114, 116 and 118 of an example hardware qualification system 105 in computer network 100 will be described in more detail with reference to the flow diagram of FIG. 5.

Accordingly, at least one embodiment includes automatic discovery of supported capabilities of server hardware components. As detailed herein, such an embodiment includes extending hardware qualification techniques to examine supported capabilities to enable at least one user to automatically select one or more particular hardware components and/or enable or disable certain functions.

Engineered solutions can support multiple consumption models including, for example, a purpose-built appliance from a factory or a system allowing for bring-your-own (BYO) hardware wherein the solution software is installed to build the user's own appliance based on a hardware compatibility list (HCL). Because many management features in such solutions are built for a purpose-built appliance wherein hardware capabilities are known ahead of time, at least one embodiment includes automatically detecting the supported capabilities of a device for BYO hardware use cases such that, for example, a given solution can degrade certain device behavior gracefully without impacting user experience if certain capabilities are not supported by the BYO hardware.

By way of example, at least one embodiment includes, for one or more server configurations, processing relevant data to determine if various operations are supported by a server being added to a cluster. Such operations can include, for example, blinking and/or clearing a server light-emitting diode (LED) for identification and status purposes, node failure detection, node panic detection, node reachability/unreachability detection, node isolation detection, etc. As noted above, node panic detection includes detecting a node condition wherein the node is not stable. For example, such a condition might be present when the node's host operating system (OS) is rebooting frequently and/or important processes running on the node are not consistently in a stable state (e.g., restarting frequently).

Additionally or alternatively, in connection with determining the health of a disk device, at least one embodiment includes determining if various operations are supported by a given drive and/or enclosure. Such operations can include, for example, drive and/or enclosure inventory assessment(s), querying information pertaining to a specific drive and/or enclosure, drive health status determinations (e.g., good, suspected failure, bad, etc.), endurance level determinations, wearing level (also referred to herein as remaining lifespan) determinations, smart counting, smart self-test status determinations, smart self-test scheduling, blinking and/or clearing a disk LED for identification and status purposes, blinking and/or clearing a disk enclosure LED for identification and status purposes, etc.

Additionally or alternatively, in connection with technical support, at least one embodiment includes determining if various operations are supported from hardware. Such operations can include, for example, tech support report (TSR) log retrieval, hardware events subscription(s), firmware upgrade(s), safe device replacement(s), etc. Further, for detecting input-output operations per second (IOPS) of a given disk drive, at least one embodiment includes determining if various operations and/or parameters are supported by the disk drive. Such operations and/or parameters can include, for example, drive transaction throughput, drive bandwidth throughput, drive throughput setting maximum, drive response time at maximum, drive response time at 50% and 80% (that is, if the disk capacity is 50% filled or 80% filled, determining how the disk would perform), error rate at maximum, error rate at 50% and 80%, parallelization of drive checks through concurrent jobs, drive availability, etc. Also, for detecting the network throughput across two nodes, at least one embodiment includes determining if various operations and/or parameters are supported such as, for example, network throughput, network error rate, network latency, network redundancy check(s), etc.

Accordingly, as further detailed herein, one or more embodiments include conducting an inventory of hardware components and determining what capabilities given hardware devices support that can be leveraged in connection with one or more automated actions (e.g., actions related to maintenance, remediation, notification, etc.). Such an embodiment includes generating and/or implementing a hardware monitoring tool in the form of a software agent configured to run on a host OS and discover devices directly and/or via baseboard management controller (BMC) interfaces. Such devices can include, for example, remote access controllers, Redfish application programming interfaces (APIs), intelligent platform management interfaces (IPMIs), host OS, etc.

In at least one embodiment, in connection with discovering server capabilities, a hardware monitoring tool (in the form of a software agent) performs discovery of server capabilities depending on BMC vendor and/or BMC type. For example, for certain BMCs and/or remote access controllers, server capabilities are determined using one or more Redfish APIs, one or more IPMIs, and/or one or more vendor-specific APIs. In such an embodiment, using a Redfish API can include attempting to access a third-party server BMC through investigation of Redfish API support by the BMC. Also, an embodiment that includes using one or more IPMIs can include attempting IPMI calls to the BMC in an effort to provide the least amount of supported functionality. Additionally or alternatively, an embodiment that includes using one or more vendor-specific APIs can include using vendor-specific API calls such as, e.g., integrated management module II (IMM) for Lenovo® servers, Integrated Lights-out (iLO) for HPE servers, etc.

In one or more embodiments, in connection with discovering storage enclosure capabilities, a hardware monitoring tool (in the form of a software agent) can employ and/or implement a variety of techniques. For example, in such an embodiment, small computer system interface (SCSI) enclosure services (SES) devices can be discovered through an OS and/or through vendor-specific HBA commands or disk array controllers (e.g., redundant array of inexpensive disks (RAID) controllers). Additionally, using SES specification queries, one or more capabilities can be determined and stored for each SES device, wherein such capabilities can include, for example, the capability to turn on/off an identification LED (e.g., an identification LED for drive slots, an identification LED for sub-enclosures, etc.).

Also, in at least one embodiment, in connection with discovering drive capabilities, a hardware monitoring tool (in the form of a software agent) discovers one or more drives through an OS, vendor-specific HBA commands, disk array controllers (e.g., RAID controllers), and/or a specific storage library provided by a vendor. By way of example, using T10 and T13 queries, various capabilities can be determined and stored for each drive, wherein such capabilities can include, for example, smart self-test execution capability, smart self-test progress querying capability, endurance level querying capability, smart data querying capability, the capability to turn on/off an identification LED for a slot (in which the drive is installed), the capability to calculate drive health using at least one algorithm using T10 and/or T13 query information, etc.

Further, in one or more embodiments, in connection with discovering channel card capabilities, a hardware monitoring tool (in the form of a software agent) can perform discovery of third party off-menu channel cards capabilities via vendor-provided OS utilities and/or libraries. By way of example, such channel cards can include various types of peripheral component interconnect express (PCIe) cards that are added to a server to enhance the capabilities of a purpose-built appliance. However, in some instances, such cards are not yet qualified by definition to be on-menu cards for the mainstream server. In one or more embodiments, such cards can include at least one non-volatile memory express (NVMe) add-in card, at least one RAID controller, at least one fibre channel (FC) HBA, at least one serial attached SCSI (SAS) HBA, at least one graphics processing unit (GPU), at least one PCIe accelerator card, etc.

Also, in at least one embodiment, in connection with discovering technical support capabilities, a hardware monitoring tool (in the form of a software agent) can perform discovery of server capabilities depending on BMC vendor and/or BMC type, or via direct interface to hardware to monitor and/or identify capabilities such as, for example, TSR log retrieval, subscription to hardware events, firmware upgrade(s), safe device replacement(s), etc.

Further, in connection with discovering IOPS of one or more drives, at least one embodiment includes using an input/output tool (e.g., an FIO tool) to measure the throughput of a given drive by performing reads/writes of at least one fixed block. Such an embodiment includes determining the IOPS of drives to inform a user if a correct and/or appropriate drive was selected.

Additionally, in connection with discovering network throughput, one or more embodiments include using a network testing tool (e.g., iPerf) that can be configured on a host OS to transfer random packets across two or more nodes. Such an embodiment includes detecting if NIC teaming and bonding is misconfigured by a user, which may result in poor performance and/or data loss.

Also, in connection with monitoring system performance, at least one embodiment includes using a computer system monitoring tool (e.g., iostat) to monitor and collect operating system storage input and output statistics to identify one or more performance issues with storage devices. Such an embodiment includes reporting performance statistics of storage devices to the user for use in one or more automated and/or directed actions.

Figure 2:
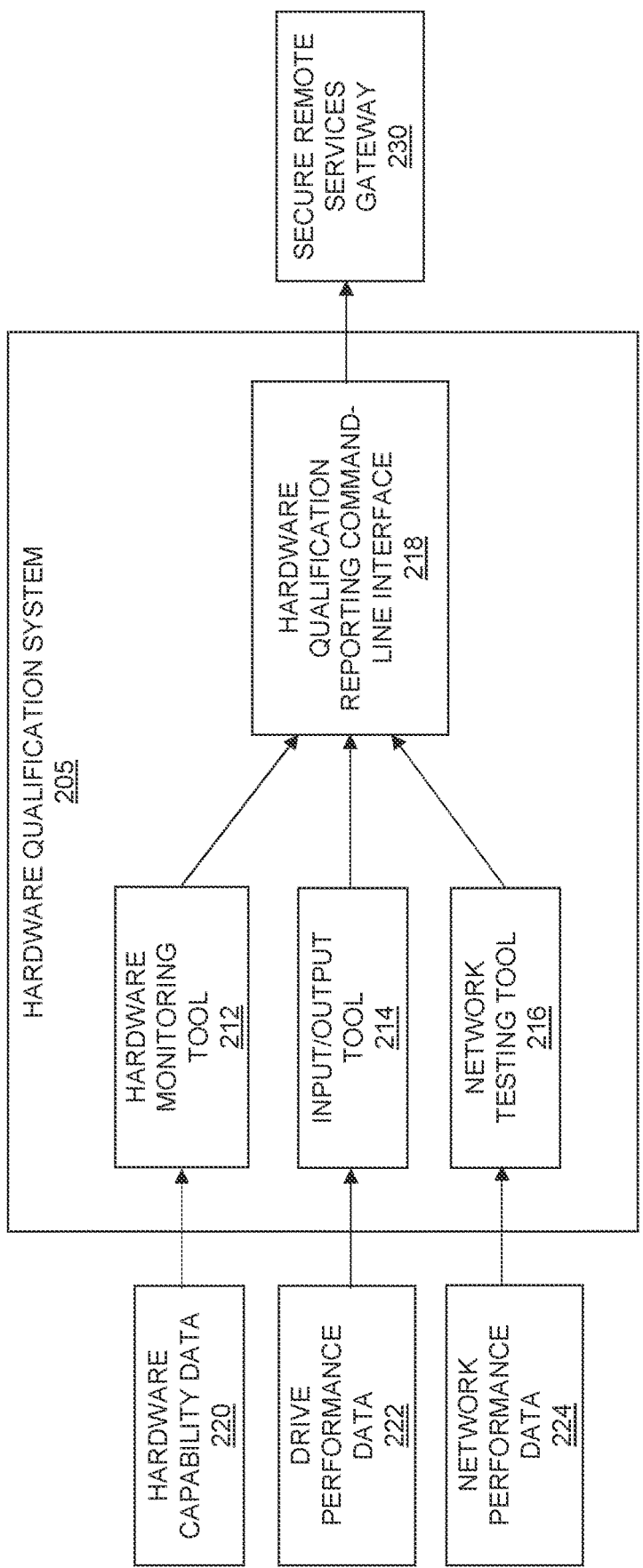
FIG. 2 shows example hardware qualification system architecture and implementation in an illustrative embodiment.

FIG. 2 shows example hardware qualification system architecture and implementation in an illustrative embodiment. In an example embodiment such as depicted in FIG. 2, hardware qualification system 205 is implemented to determine and/or ensure that a given instance or set of BYO hardware meets one or more recommended guidelines and one or more user-provided configurations are producing at least one desired performance benchmark. Specifically, in such an embodiment, within hardware qualification system 205, hardware monitoring tool 212 processes hardware capability data 220, input/output tool 214 (e.g., a FIO tool) processes drive performance data 222, and network testing tool 216 (e.g., iPerf) processes network performance data 224. By way of example, processing of disk performance test data (which can be contained within drive performance data 222) by input/output tool 214 can facilitate determining if one or more disks are producing desired throughput for block I/O. Similarly, by way of further example, processing network performance data 224 by network testing tool 216 can facilitate determining if configurations, such as link aggregation control protocol (LACP) bonding, maximum transmission unit (MTU) settings, etc., are properly carried out before installing the relevant software.

As also depicted in FIG. 2, hardware qualification system 205 can run a hardware qualification reporting CLI 218 in connection with one or more candidate nodes (e.g., servers and/or hardware devices). In such an embodiment, hardware qualification reporting CLI 218 processes data obtained from hardware monitoring tool 212, input/output tool 214, and network testing tool 216. For example, data obtained from hardware monitoring tool 212 can include data pertaining to BMC support discovery, node failure detection, disk drive and/or enclosure discovery, disk drive and/or enclosure capabilities, LED capabilities discovery, etc. Also, by way of example, data obtained from input/output tool 214 and network testing tool 216 can include various performance benchmarking data.

Hardware qualification reporting CLI 218 processes at least a portion of the data obtained from hardware monitoring tool 212, input/output tool 214, and network testing tool 216, and based at least in part on such processing and on one or more rule engine configurations, produces a report on the individual node(s) in question. In connection with the hardware qualification reporting CLI 218 processing the above-noted data, in one or more embodiments, multiple types of processing can be carried out such as, for example, determining that a feature is supported or not supported (e.g., whether a drive supports one or more SMART tests), and determining that a feature meets or does not meet a configured criteria (e.g., whether a drive speed is greater than a minimum value required). Configuration data can include, for example, a list of components, values and/or calculations to execute in order to determine whether a component meets minimum expectations for support (e.g., a drive needs to write data at a speed greater than eight megabytes per second).

Accordingly, as depicted in FIG. 2, once data are collected by one or more specific tools such as hardware monitoring tool 212, input/output tool 214, and/or network testing tool 216, the data are processed and compared with one or more acceptable thresholds and/or values. In at least one embodiment, a rule engine includes product-specific rule files to compare reported values with an acceptable range of values, and based on such a comparison, the rule can output Yes or No. This report of Yes/No can be used by a user/customer and/or an automated system to qualify or disqualify the device. Further, in connection with one or more embodiments, a server with one or more disqualified devices cannot be added to a cluster.

Accordingly, in one or more embodiments, hardware qualification system 205 orchestrates an execution flow and consolidates reports from each of one or more candidate nodes to generate a final report. Such a report can, for example, be output to one or more consoles or displays for review, and/or exported to an automated system via secure remote services (SRS) gateway 230.

Figure 3:
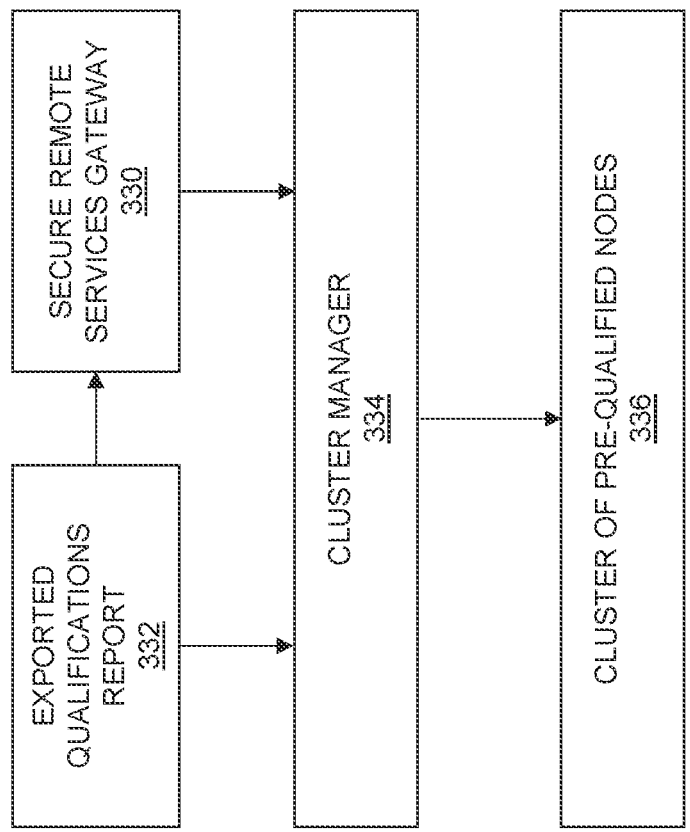
FIG. 3 shows an initial cluster setup from pre-qualified nodes in an illustrative embodiment.

FIG. 3 shows an initial cluster setup from pre-qualified nodes (e.g., servers) in an illustrative embodiment. In connection with one or more example embodiments, as depicted in FIG. 3, after a user runs and/or implements a hardware qualification system (such as, e.g., system 105, 205, and/or 405) to perform pre-qualification of BYO hardware, the report 332 generated by the hardware qualification system can be imported directly into a cluster manager 334 or indirectly to the cluster manager 334 via an SRS gateway 330. The report 332 can be utilized and/or processed by the cluster manager 334 to identify and/or discover device capabilities from previous runs without re-running the hardware qualification application (e.g., the CLI) on already-qualified nodes. Additionally, importing the qualifications report 332 into the cluster manager 334 facilitates the determination of a cluster of pre-qualified nodes 336 and, accordingly, expedites the configuration of a given solution by precluding the need to prompt a user for inputs already collected as part of the qualification checks.

Accordingly, as detailed herein, once the qualification tool is run on a server, a resulting report is saved. A user/customer and/or professional services entity can then review the report and determine the hardware to be acceptable. Additionally, a cluster manager can be used to add the server to the cluster. In such an embodiment, the cluster manager has to run the qualification check before adding a server to the cluster. If the check was already performed, the user/customer will upload the report to the cluster manager and the cluster manager will interpret the result and proceed accordingly.

Figure 4:
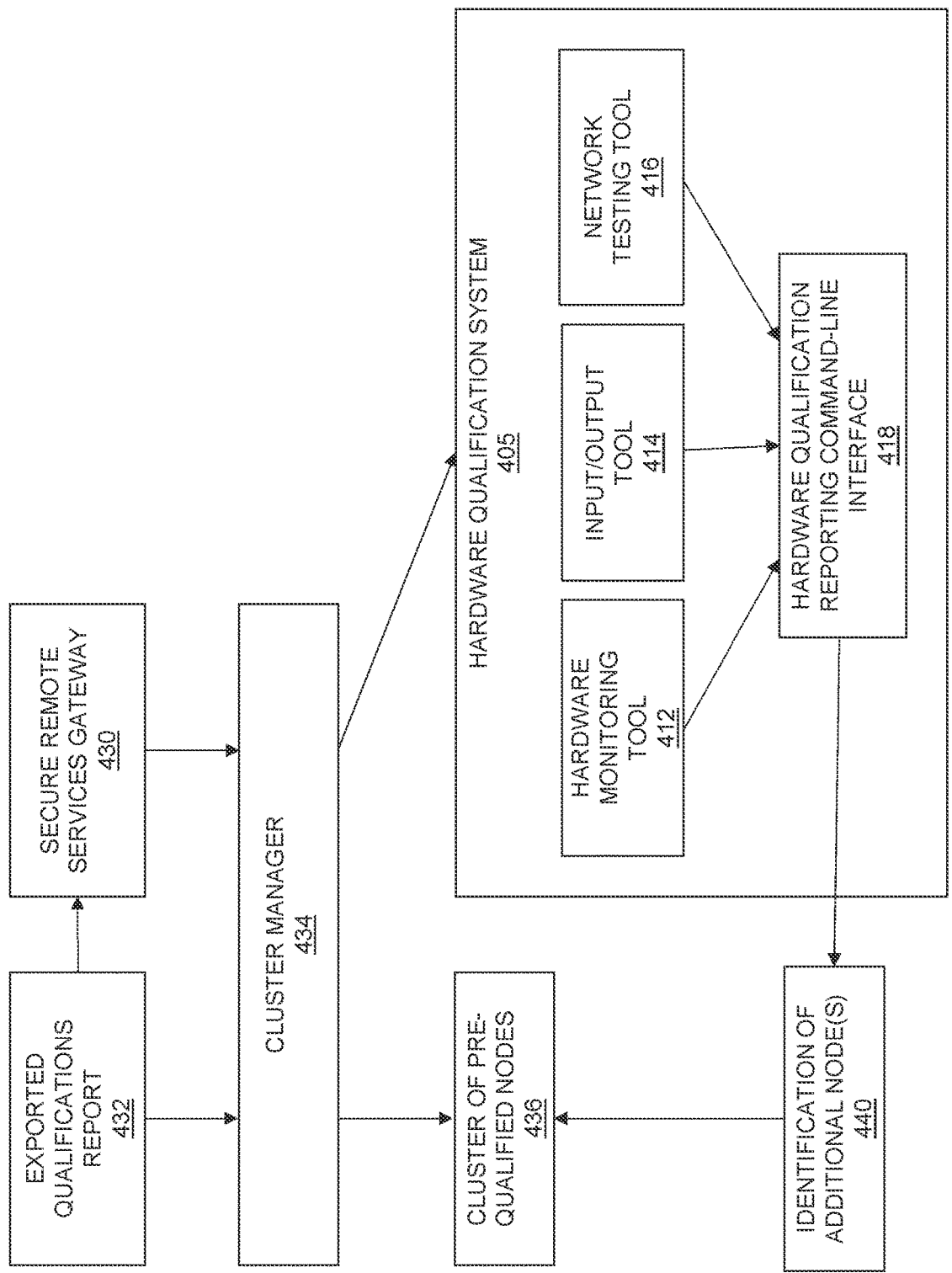
FIG. 4 shows cluster expansion using a hardware qualification system in an illustrative embodiment.

FIG. 4 shows cluster expansion using a hardware qualification system in an illustrative embodiment. It is to be noted that one or more components illustrated in FIG. 4 (e.g., hardware monitoring tool 412, input/output tool 414, network testing tool 416, hardware qualification reporting CLI 418, exported qualifications report 432, secure remote services gateway 430, and cluster of pre-qualified nodes 436) are similar to components illustrated in FIG. 1, FIG. 2 and/or FIG. 3. Additionally, as depicted in FIG. 4, when a user wants to expand a cluster of pre-qualified nodes using a cluster manager interface (e.g., a user interface (UI), API, CLI, etc.), the user proposes one or more new/additional nodes (BYO hardware) and the cluster manager 434 automatically runs hardware qualification system 405 on the new/additional node(s) to discover capabilities and determine if the one or more nodes (identified via component 440 in FIG. 4) are suitable for the cluster expansion.

Also, as detailed herein, at least one embodiment includes facilitating and/or implementing a graceful degradation of one or more cluster manager features. Graceful degradation (also referred to herein as adapting to discovered capabilities) can refer to providing alternate behavior rather than limiting the user/customer. For example, if an API is called to perform an operation on a component that does not support the request, a "not supported" notification will be returned.

In such an embodiment, the cluster manager can maintain a map of features expected from each device for the factory-built nodes. For a BYO hardware consumption model, the cluster manager discovers server and device capabilities using a hardware qualification system (such as detailed herein) and compares the discovered capabilities against an expected list of features. The cluster manager then enables or disables specific features gracefully on the web UI using a variety of techniques to provide an improved user/customer experience.

By way of example, such techniques can include implementing customer replaceable unit (CRU) and/or field replacement unit (FRU) workflows for safe replacement of at least one device. For instance, if safe replacement of a drive is not supported, then the cluster manager CRU/FRU workflow can put the given server in maintenance mode, which automatically drains the workload and then ejects the server from the cluster. In such a scenario, a user would need to shut down the relevant node, replace the drive and then startup the server. The cluster manager would then bring the node back to the cluster as if the node was a new node joining the cluster. In another example, if safe replacement of a drive was supported, then the cluster manager CRU/FRU workflow can put the server in maintenance mode, eject the drive from the storage solution, and let the user replace the drive. Once the new drive insertion event is received from the BMC, the cluster manager would add the drive back to the storage solution to restore storage capacity.

By way of further example, such techniques can also include utilizing visual indicators to reflect LED behavior of server(s) and/or drive(s). In such a scenario, the cluster manager includes UI graphics to show the server(s) and drives, and if LED behavior of the server(s) and/or drive(s) cannot be controlled, the cluster manager UI can gray out the relevant visual with help text to indicate that the capability is not supported. Additionally or alternatively, such techniques can further include downloading TSR logs. For instance, when tech support attempts to download a support log bundle, the cluster manager can indicate which device logs are to be included in the bundle, depending upon which devices support the log bundle capability.

Further still, such techniques can also include upgrading firmware and/or software on a server. For instance, a user can download the next version of a release certification matrix (RCM) bundle (e.g., a validated software and/or firmware bundle) from a support site, and the user can then upload the RCM bundle via a cluster manager UI to initiate the upgrade. Accordingly, the cluster manager upgrade flow will indicate which device(s) cannot be upgraded and will query the user to upgrade the given device(s), for example, separately using one or more third party tools.

As also detailed herein, one or more embodiments include implementing relative performance benchmarking over the lifetime of a solution. In such an embodiment, the cluster manager records the performance benchmark report generated by the hardware qualification system at the time of installation, and runs the hardware qualification system periodically and/or after every upgrade to measure and record the performance benchmark at such temporal instances. The historical benchmark can be shown in the cluster manager UI in a graphical format to reveal a pattern, if any, which can facilitate discovery (e.g., by a user) of the degradation in certain device performance data before a device failure.

Figure 5:
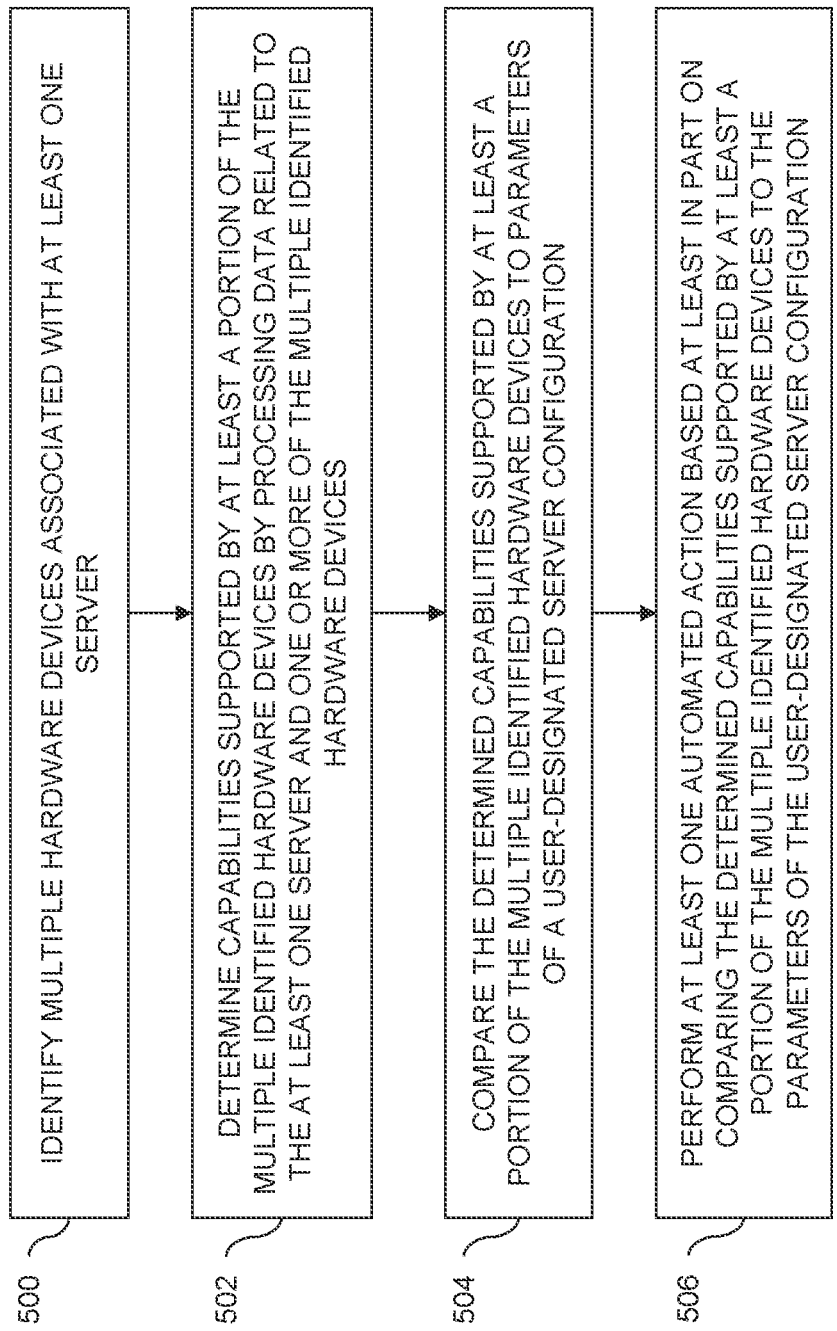
FIG. 5 is a flow diagram of a process for automatically determining supported capabilities in server hardware devices in an illustrative embodiment.

FIG. 5 is a flow diagram of a process for automatically determining supported capabilities in server hardware devices in an illustrative embodiment. It is to be understood that this particular process is only an example, and additional or alternative processes can be carried out in other embodiments.

In this embodiment, the process includes steps 500 through 506. These steps are assumed to be performed by the hardware qualification system 105 utilizing its modules 112, 114, 116 and 118.

Step 500 includes identifying multiple hardware devices associated with at least one server. In at least one embodiment, identifying the multiple hardware devices includes implementing one or more data processing tools in a form of at least one software agent configured to run on a host operating system associated with the at least one server. In such an embodiment, the one or more data processing tools include at least one of a hardware monitoring tool, an input-output tool, and a network testing tool. Additionally or alternatively, in such an embodiment, implementing the one or more data processing tools includes utilizing one or more baseboard management controller interfaces.

Step 502 includes determining one or more capabilities supported by at least a portion of the multiple identified hardware devices by processing data related to the at least one server and one or more of the multiple identified hardware devices. In one or more embodiments, determining the one or more capabilities includes determining at least one of one or more server capabilities, one or more storage enclosure capabilities, one or more drive capabilities, one or more channel cards capabilities, one or more technical support capabilities, input-output operations per second information of one or more drives, network throughput information, and system performance information.

Step 504 includes comparing the one or more determined capabilities supported by at least a portion of the multiple identified hardware devices to one or more parameters of a user-designated server configuration. In at least one embodiment, the one or more parameters of the user-designated server configuration include one or more user-provided hardware device configurations related to producing at least one desired performance benchmark.

Step 506 includes performing at least one automated action based at least in part on comparing the one or more determined capabilities supported by at least a portion of the multiple identified hardware devices to the one or more parameters of the user-designated server configuration. In one or more embodiments, performing the at least one automated action includes automatically configuring one or more of the multiple identified hardware devices as part of the user-designated server configuration.

Also, in at least one embodiment, performing the at least one automated action includes generating, using a hardware qualification reporting command-line interface, at least one report related to one or more determined capabilities of one or more of the multiple hardware devices. Such an embodiment can also include importing the at least one report to a cluster manager for use in determining a cluster of pre-qualified hardware devices for the user-designated server configuration. Additionally or alternatively, such an embodiment can also include exporting the at least one report to at least one automated system associated with management of the at least one server using a secure remote services gateway and/or outputting the at least one report to one or more displays associated with management of the at least one server.

The techniques depicted in FIG. 5 can also, in one or more embodiments, include implementing one or more relative performance benchmarking techniques in connection with the user-designated server configuration based at least in part on analysis of the one or more determined capabilities supported by at least a portion of the multiple identified hardware devices.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine what capabilities are supported by various hardware devices and perform automated actions in connection with server solution configurations based thereon. These and other embodiments can effectively overcome challenges associated with uncertainty arising from a lack of knowledge regarding what functionalities a varied hardware solution can provide to a user.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
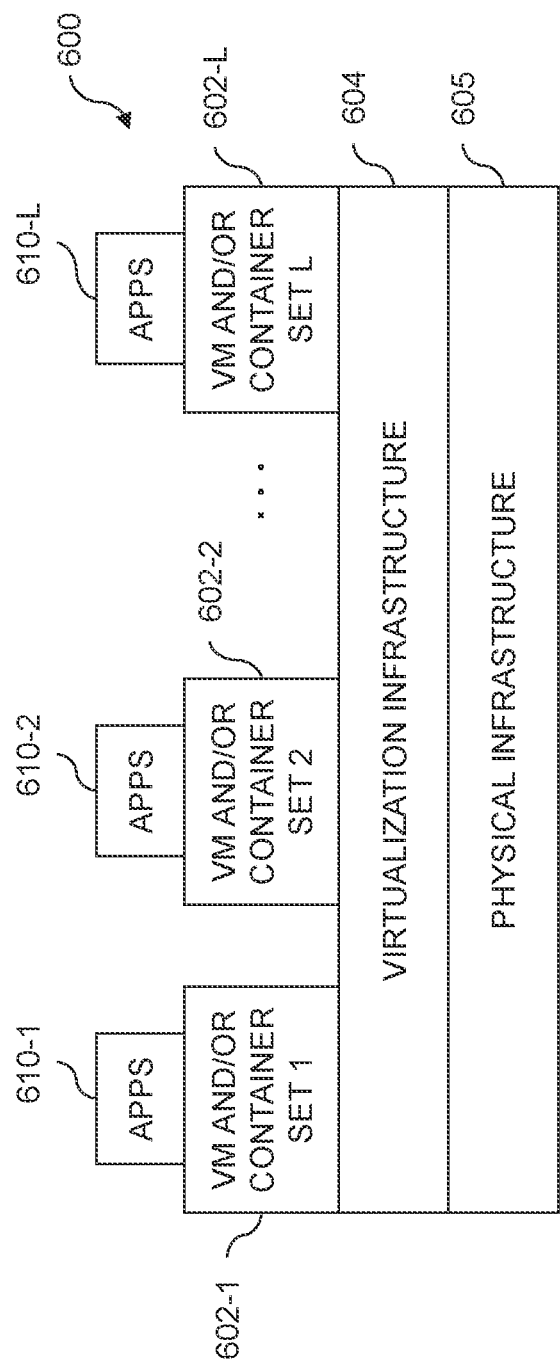
FIGS. 6 and 7 show examples of processing platforms that may be utilized to implement at least a portion of an information processing system in illustrative embodiments.
Figure 7:
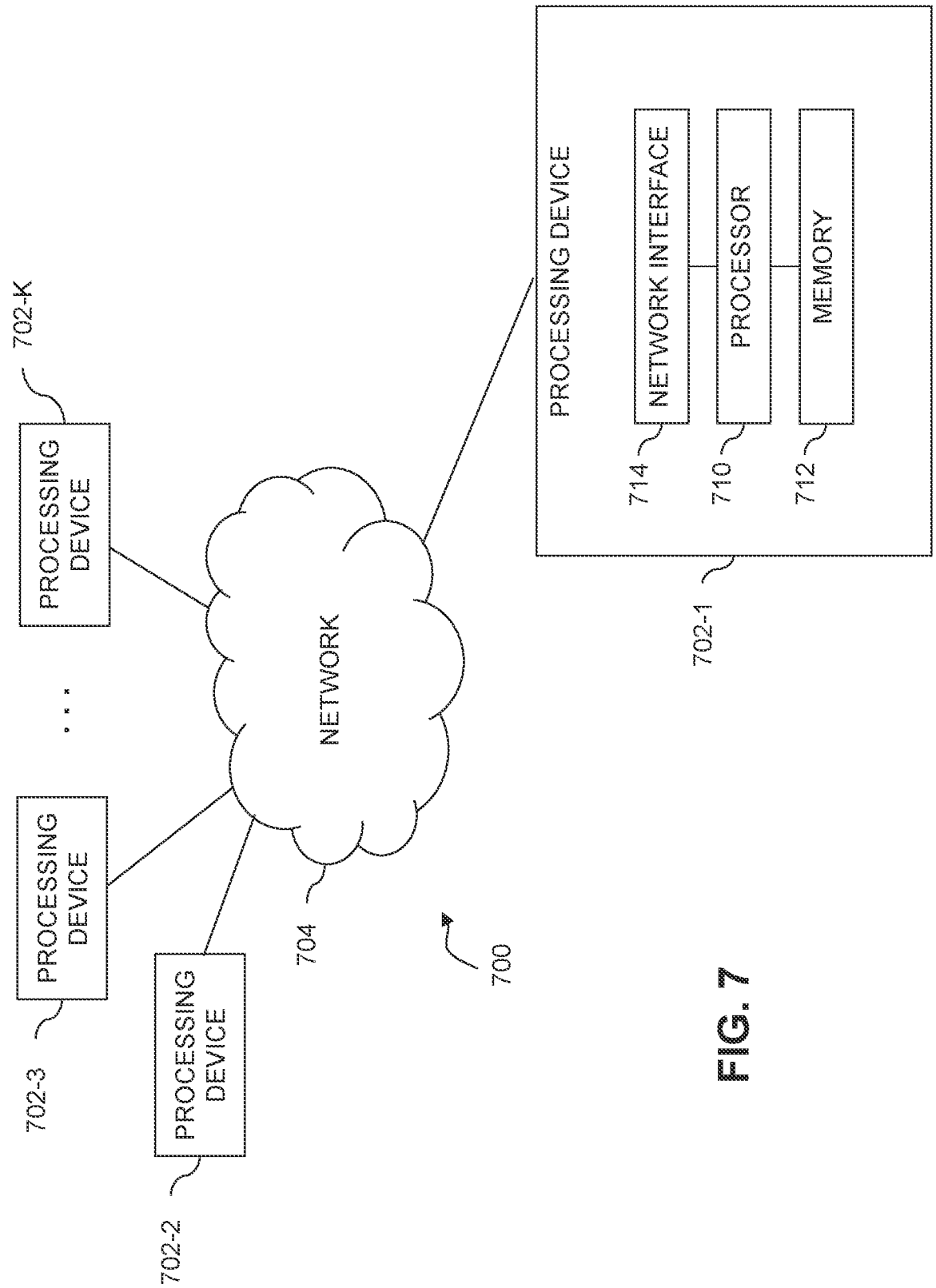

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   identifying multiple hardware devices associated with at least one server;
   determining capabilities supported by at least a portion of the multiple identified hardware devices by processing data related to the at least one server and one or more of the multiple identified hardware devices, wherein determining the capabilities comprises determining one or more server capabilities, one or more storage enclosure capabilities, one or more drive capabilities, one or more channel cards capabilities, one or more technical support capabilities, input-output operations per second information of one or more drives, network throughput information, and system performance information;
   comparing the capabilities supported by at least a portion of the multiple identified hardware devices to multiple parameters of a user-designated server configuration related to the capabilities; and
   performing at least one automated action based at least in part on comparing the capabilities supported by at least a portion of the multiple identified hardware devices to the multiple parameters of the user-designated server configuration related to the capabilities, wherein performing the at least one automated action comprises:
generating, using a hardware qualification reporting command-line interface, at least one report related to at least a portion of the capabilities of one or more of the multiple hardware devices; and
importing the at least one report to a cluster manager for use in determining a cluster of pre-qualified hardware devices for the user-designated server configuration;
wherein the method is performed by at least one processing device comprising a processor coupled to a memory.

2. The computer-implemented method of claim 1, wherein identifying the multiple hardware devices comprises implementing one or more data processing tools in a form of at least one software agent configured to run on a host operating system associated with the at least one server.

3. The computer-implemented method of claim 2, wherein the one or more data processing tools comprise at least one of a hardware monitoring tool, an input-output tool, and a network testing tool.

4. The computer-implemented method of claim 2, wherein implementing the one or more data processing tools comprises utilizing one or more baseboard management controller interfaces.

5. The computer-implemented method of claim 1, further comprising:
exporting the at least one report to at least one automated system associated with management of the at least one server using a secure remote services gateway.

6. The computer-implemented method of claim 1, further comprising:
outputting the at least one report to one or more displays associated with management of the at least one server.

7. The computer-implemented method of claim 1, wherein performing the at least one automated action comprises automatically configuring one or more of the multiple identified hardware devices as part of the user-designated server configuration.

8. The computer-implemented method of claim 1, further comprising:
implementing one or more relative performance benchmarking techniques in connection with the user-designated server configuration based at least in part on analysis of the capabilities supported by at least a portion of the multiple identified hardware devices.

9. The computer-implemented method of claim 1, wherein the multiple parameters of the user-designated server configuration comprise one or more user-provided hardware device configurations related to producing at least one desired performance benchmark.

10. A non-transitory processor-readable storage medium having stored therein program code of one or more software programs, wherein the program code when executed by at least one processing device causes the at least one processing device:
to identify multiple hardware devices associated with at least one server;
to determine capabilities supported by at least a portion of the multiple identified hardware devices by processing data related to the at least one server and one or more of the multiple identified hardware devices, wherein determining the capabilities comprises determining one or more server capabilities, one or more storage enclosure capabilities, one or more drive capabilities, one or more channel cards capabilities, one or more technical support capabilities, input-output operations per second information of one or more drives, network throughput information, and system performance information;
to compare the capabilities supported by at least a portion of the multiple identified hardware devices to multiple parameters of a user-designated server configuration related to the capabilities; and
to perform at least one automated action based at least in part on comparing the capabilities supported by at least a portion of the multiple identified hardware devices to the multiple parameters of the user-designated server configuration related to the capabilities, wherein performing the at least one automated action comprises:
generating, using a hardware qualification reporting command-line interface, at least one report related to at least a portion of the capabilities of one or more of the multiple hardware devices; and
importing the at least one report to a cluster manager for use in determining a cluster of pre-qualified hardware devices for the user-designated server configuration.

11. The non-transitory processor-readable storage medium of claim 10, wherein identifying the multiple hardware devices comprises implementing one or more data processing tools in a form of at least one software agent configured to run on a host operating system associated with the at least one server.

12. The non-transitory processor-readable storage medium of claim 10, wherein performing the at least one automated action comprises automatically configuring one or more of the multiple identified hardware devices as part of the user-designated server configuration.

13. The non-transitory processor-readable storage medium of claim 10, wherein the program code when executed by the at least one processing device causes the at least one processing device:
to export the at least one report to at least one automated system associated with management of the at least one server using a secure remote services gateway.

14. The non-transitory processor-readable storage medium of claim 10, wherein the program code when executed by the at least one processing device causes the at least one processing device:
to output the at least one report to one or more displays associated with management of the at least one server.

15. An apparatus comprising:
at least one processing device comprising a processor coupled to a memory;
the at least one processing device being configured:
to identify multiple hardware devices associated with at least one server;
to determine capabilities supported by at least a portion of the multiple identified hardware devices by processing data related to the at least one server and one or more of the multiple identified hardware devices, wherein determining the capabilities comprises determining one or more server capabilities, one or more storage enclosure capabilities, one or more drive capabilities, one or more channel cards capabilities, one or more technical support capabilities, input-output operations per second information of one or more drives, network throughput information, and system performance information;
to compare the capabilities supported by at least a portion of the multiple identified hardware devices to multiple parameters of a user-designated server configuration related to the capabilities; and to perform at least one automated action based at least in part on comparing the capabilities supported by at least a portion of the multiple identified hardware devices to the multiple parameters of the user-designated server configuration related to the capabilities, wherein performing the at least one automated action comprises:
  generating, using a hardware qualification reporting command-line interface, at least one report related to at least a portion of the capabilities of one or more of the multiple hardware devices; and
  importing the at least one report to a cluster manager for use in determining a cluster of pre-qualified hardware devices for the user-designated server configuration.

16. The apparatus of claim 15, wherein identifying the multiple hardware devices comprises implementing one or more data processing tools in a form of at least one software agent configured to run on a host operating system associated with the at least one server.

17. The apparatus of claim 15, wherein performing the at least one automated action comprises automatically configuring one or more of the multiple identified hardware devices as part of the user-designated server configuration.

18. The apparatus of claim 15, wherein the multiple parameters of the user-designated server configuration comprise one or more user-provided hardware device configurations related to producing at least one desired performance benchmark.

19. The apparatus of claim 15, wherein the at least one processing device is further configured:
  to export the at least one report to at least one automated system associated with management of the at least one server using a secure remote services gateway.

20. The apparatus of claim 15, wherein the at least one processing device is further configured:
  to output the at least one report to one or more displays associated with management of the at least one server.

* * * * *